United States Patent [19]
Geier

[11] Patent Number: 5,745,868
[45] Date of Patent: Apr. 28, 1998

[54] METHOD FOR RAPID RECOVERY FROM DEAD RECKONING SYSTEM HEADING LOSS

[75] Inventor: George J. Geier, Scottsdale, Ariz.

[73] Assignee: Motorola, Inc., Schaumburg, Ill.

[21] Appl. No.: 578,401

[22] Filed: Dec. 26, 1995

[51] Int. Cl.$^6$ ..................................................... G06G 7/78
[52] U.S. Cl. ........................ 701/216; 701/213; 701/217; 701/215; 701/224; 364/571.03; 364/571.05; 342/357; 342/457; 340/995; 340/988; 73/178 R
[58] Field of Search ..................... 364/450, 453, 364/447, 449.1, 449.2, 459, 460, 424.07, 424.029, 454, 571.01, 571.02, 571.03, 571.04, 571.05; 342/357, 457; 340/988, 990, 995; 73/178 R

[56] References Cited

U.S. PATENT DOCUMENTS

| | | | |
|---|---|---|---|
| 4,734,863 | 3/1988 | Honey et al. | 364/449.1 |
| 5,278,424 | 1/1994 | Kagawa | 364/450 |
| 5,317,515 | 5/1994 | Matsuzaki | 364/454 |
| 5,323,152 | 6/1994 | Morita | 340/988 |
| 5,345,382 | 9/1994 | Kao | 364/457 |
| 5,416,712 | 5/1995 | Geier et al. | 364/450 |
| 5,434,788 | 7/1995 | Seymour et al. | 364/449.8 |
| 5,440,484 | 8/1995 | Kao | 364/457 |
| 5,469,158 | 11/1995 | Morita | 364/460 |
| 5,525,998 | 6/1996 | Geier | 364/449.7 |

Primary Examiner—Jacques H. Louis-Jacques
Attorney, Agent, or Firm—Bradley J. Botsch, Sr.

[57] ABSTRACT

A method of recovering the heading of a terrestrial vehicle navigation system having a GPS receiver integrated with a dead reckoning system. After determining that a current estimate of the heading may be in error (12, 14), Doppler measurement double difference observables are computed for all GPS satellites whose L band carriers are in phase or frequency track, available distance traveled and heading change information is extracted, and the results are combined and processed (20) to produce a new current heading estimate. A recursive estimator is used to guarantee convergence to an accurate result. Conventional GPS/dead reckoning combined systems generally reset to the first available GPS position following a heading loss. Gross positioning errors can accumulate up to this point, however. The methods described can recover the dead reckoning system heading by processing Doppler information from a single GPS satellite, and thus reduce position error growth occurring when the heading is unknown.

25 Claims, 3 Drawing Sheets

METHOD FOR RAPID RECOVERY FROM DEAD RECKONING SYSTEM HEADING LOSS

FIELD OF THE INVENTION

The present invention relates in general to methods for determining the heading of a terrestrial vehicle and, in particular to using a dead reckoning system and a Global Positioning System (GPS) receiver to determine a vehicle's heading from a single GPS satellite.

BACKGROUND OF THE INVENTION

Accurate positioning of a terrestrial vehicle represents an essential element of autonomous navigation systems, vehicle tracking systems, and emergency messaging systems. In-vehicle navigation systems require accurate positioning to determine the current street location of the vehicle in order to provide reliable route guidance information to the driver. In tracking systems, where the position of the vehicle is provided to a centralized facility, accurate positioning improves the efficiency of operation of the system. In emergency messaging applications, the positioning accuracy and reliability affects life-saving services. In each application, momentary loss of positioning degrades the usefulness of the service. GPS by itself cannot provide continuous positioning in any of these applications, due to obscuration of the satellite signals by buildings and other structures in dense city environments. Use of a dead reckoning system to augment GPS can afford complete coverage, excepting anomalies which can be induced in the dead reckoning system. Systems and methods providing rapid recovery from these anomalies would be very desirable.

Dead reckoning systems generally make use of methods for sensing changes in heading and distance traveled of a terrestrial vehicle. Since they provide only relative navigation information, an initial position and heading are required. Use of GPS for absolute positioning and heading therefore represents an ideal complement to dead reckoning. Errors associated with the determination of heading changes can produce completely erroneous headings, which can lead to excessive positioning error accumulation in the absence of GPS positioning. For example, a heading which is in error by 45 degrees produces a position error growth which is roughly 30 percent of distance traveled: 30 meters of error would therefore result if GPS positioning were lost while the vehicle traveled only 100 meters. Current integrated systems recover from this condition by re- initializing to an accurate GPS position and heading; such approaches suffer when GPS coverage conditions do not permit acquisition and track of at least three satellites with good geometry, however, and unacceptable levels of navigation error can result. In addition, GPS determined headings degrade significantly in accuracy at low vehicle speeds.

Thus, a method for rapidly recovering the heading of the dead reckoning system is sought which minimizes this error accumulation. A method which could make use of information from fewer than three GPS satellites (the minimum required for a heading to be derived from GPS), and permit an accurate heading to be determined at lower vehicle speeds is needed. Such a technique would reduce the dependence on GPS coverage and vehicle speed and so permit an accurate heading to be derived more quickly.

DETAILED DESCRIPTION OF THE DRAWINGS

A preferred embodiment of the present method uses a system comprised of a GPS receiver, a means for accepting heading change and distance traveled information from a dead reckoning system installed in a terrestrial vehicle, and software implemented within a microprocessor to implement the heading recovery algorithm. The microprocessor can be embedded within the GPS receiver, or mechanized externally.

Figure 1:
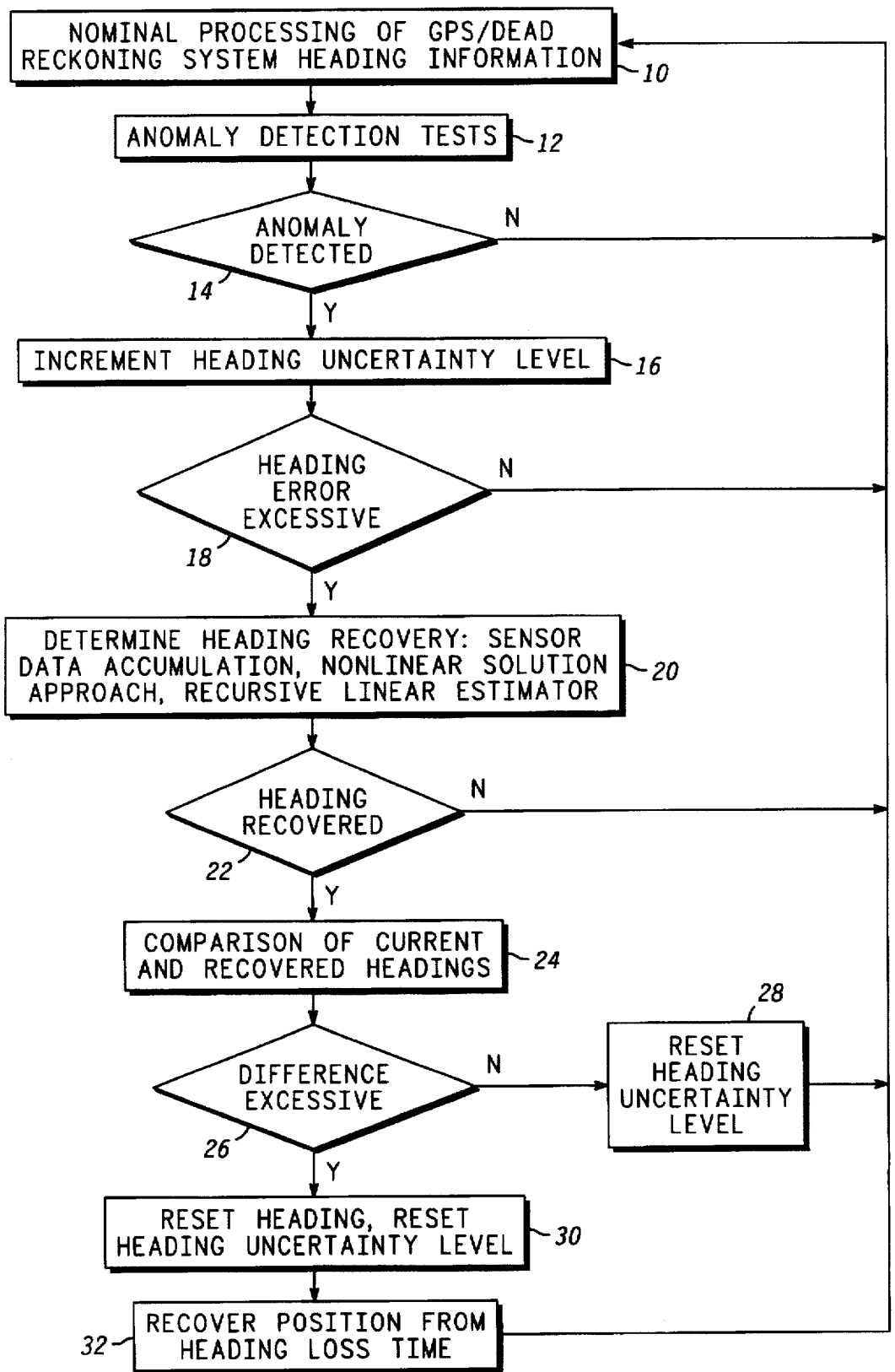
FIG. 1 is a flowchart in accordance with a preferred embodiment of the invention that illustrates a method for rapid recovery from a dead reckoning system heading loss.

FIG. 1 illustrates a sequence of events and tests which are implemented within the microprocessor to carry out a preferred embodiment of the invention. Nominal processing 10 of the GPS/dead reckoning (DR) system information (i.e., distance traveled and heading change information) occurs first, where it is assumed that the data from the dead reckoning system is unfailed. Following this step 10, anomaly detection tests 12 are made in FIG. 1 to determine if an anomaly has occurred in the dead reckoning system. The anomaly detection tests 12 are specific to the sensors used in the dead reckoning system. Specific methods comprising anomaly detection tests 12 are set forth in FIGS. 3 and 4 and explained in detail below.

Figure 2:
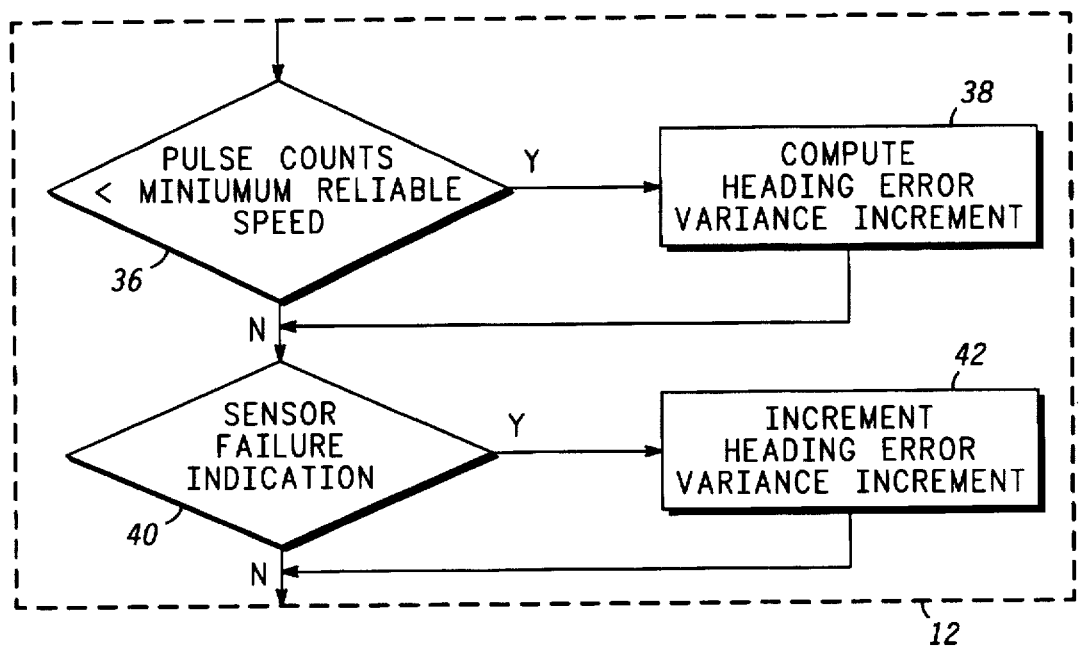
FIG. 2 is a flowchart illustrating anomaly detection tests of FIG. 1 in a dead reckoning system based upon differential odometry.

The anomaly detection tests 12 that trigger the heading recovery algorithm are dependent upon the methods used by the dead reckoning system to sense heading change. FIG. 2 illustrates tests for differential odometry based heading rate (i.e., using the outputs of sensors installed on at least two laterally opposed wheels). For variable reluctance based wheel sensors, pulse counts can be lost at very low speed. Thus, step 36 compares pulse counts and compares them with a rate associated with a minimum reliable speed. If the pulse count is less than that for a minimum reliable speed, step 38 illustrates that an increment to the error variance associated with dead reckoning system heading anomalies is computed.

In addition in FIG. 2, tests are performed on the reasonableness of the sensed heading change (sensor failure indication step 40). With any indication of such a sensor failure in step 40, as could be induced by tire skidding or slipping, an increment is made to the anomalous heading error variance in step 42. The reasonableness tests in step 40 include tests against the maximum achievable speed and heading rate of the vehicle, in addition to tests against maximum possible lateral and longitudinal acceleration levels.

Figure 3:
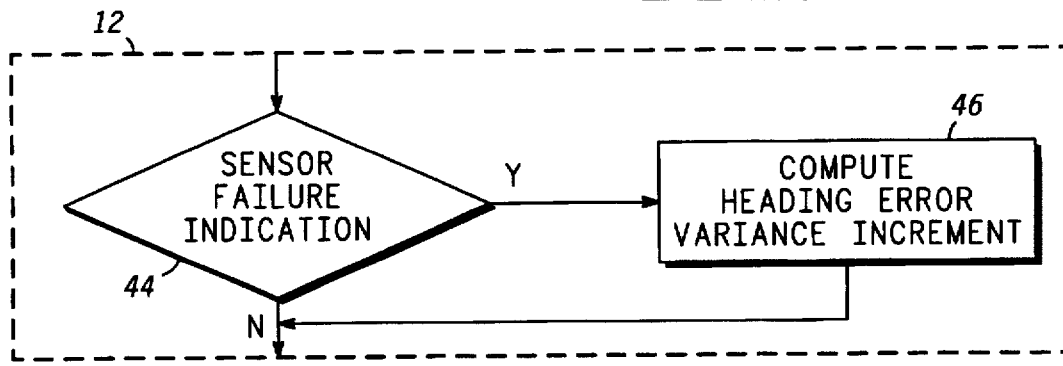
FIG. 3 is a flowchart illustrating anomaly detection tests of FIG. 1 in a dead reckoning system based upon use of a heading rate sensor.

For heading rate sensor based dead reckoning, illustrated in FIG. 3, only sensor failure tests are applied (step 44) as anomaly detection tests 12. The heading error variance is incremented (step 46) whenever there is an indication of sensor failure (step 44).

After the anomaly detection tests 12 in FIG. 1, a decision step 14 is then made to determine if an anomaly occurred in the determination of heading by the dead reckoning system.

If no anomaly occurred, the method branches so that nominal processing (step 10) continues. Conversely, detection of an anomaly results in an increment to the heading uncertainty level (step 16). The heading uncertainty level increment represents (in a statistical sense) the worst-case heading error which may have been induced by the anomaly. If a Kalman filter is utilized to estimate the vehicle's heading, the error variance associated with the dead reckoning system heading will be increased by this amount in step 16.

Following the increment in the heading uncertainty level (step 16) in FIG. 1, a test (decision step 18) is made to determine if the heading uncertainty level is excessive. An excessive heading error is defined to be one which will prevent the nominal processing step 10 from operating effectively; e.g., an error which violates the statistical tests which may be performed by a Kalman filter, or one which violates the linearity assumptions of a Kalman filter that is used to process the dead reckoning system heading. If the detected anomalies do not produce a heading error which is excessive (the "no" branch of step 18), nominal processing 10 will continue. An excessive heading error, conversely, results in the step of initiating heading recovery sensor data accumulation (step 20). The initiation of the heading recovery algorithm (step 20) represents a key segment of the preferred embodiment of the present invention, and is shown in greater detail in FIG. 4.

Figure 4:
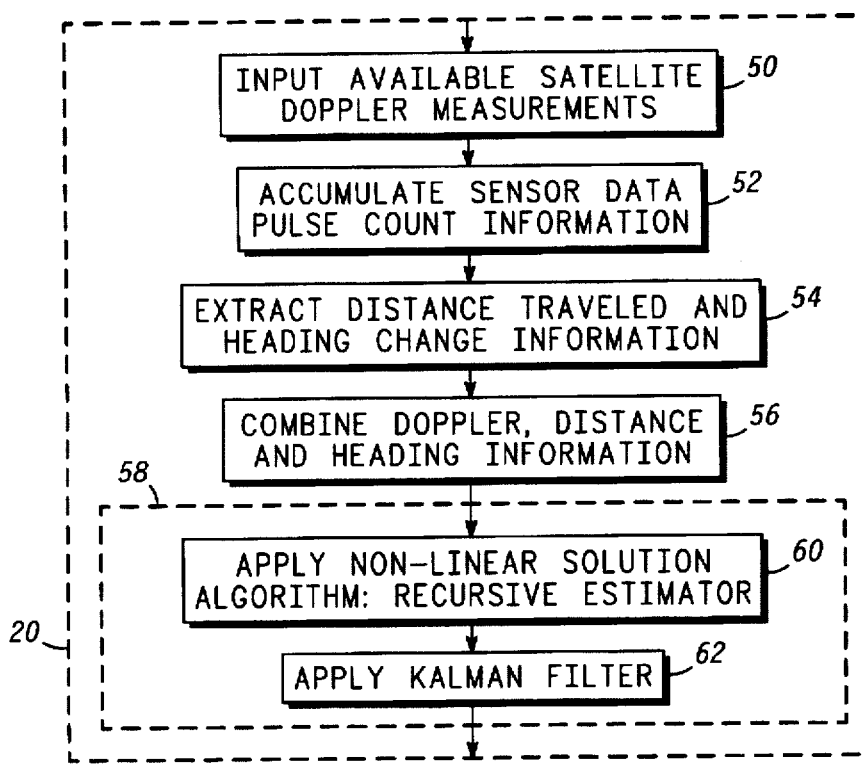
FIG. 4 is a flowchart illustrating a method for determining heading recovery in accordance with the method shown in FIG. 1.

FIG. 4 illustrates a method for determining a recovered heading. Available satellite Doppler measurements are input (step 50) and sensor data (pulse count information) are accumulated (step 52). Distance traveled information and heading change information are extracted from the sensor data (step 54). The recovery algorithm applied (step 58) in FIG. 4 comprises two major components. The first is a nonlinear heading solution algorithm (step 60) for deriving heading measurements each iteration (nominally at one (1) second intervals) from sensed speed, heading change, and available satellite Doppler measurements (combined in step 56). The second component includes a single state Kalman filter which is applied (step 62) and processes these measurements and ensures convergence to a valid heading solution.

The Kalman filter in the second component of the recovery algorithm (step 62) operates separately from any Kalman filter that may be used to process dead reckoning system heading information as part of the nominal processing 10 in FIG. 1. The nonlinear solution algorithm (step 60 in FIG. 4) can make use of the heading information from as few as one or two GPS satellites. The single satellite solution requires that the GPS receiver oscillator has adequate short-term stability. The two satellite solution, based on single Doppler differences, is immune to the error induced by receiver's clock. The two satellite solution approach is reviewed in detail in the following paragraphs.

The equation from which the desired relationship between the unknown heading and the GPS and dead reckoning system observables is based upon GPS Doppler measurement double differences, as given below:

$$\delta \Delta Dopp_{res} = \Delta Dopp_{res}(t_k) - \Delta Dopp_{res}(t_{k-1}) = (Dopp_{res}{}^i(t_k) - Dopp_{res}{}^j(t_k)) - (Dopp_{res}{}^i(t_{k-1}) - Dopp_{res}{}^j(t_{k-1})) \quad (1)$$

where $Dopp_{res}{}^i(t_k)$ is the Doppler measurement residual for the ith GPS satellite at time $t_k$ (measured Doppler corrected for satellite motion and clock drift). Equation (1) can be functionally related to the (unknown) heading (at time $t_k$) and the sensed heading and/or speed change over the last second:

$$\delta \Delta Dopp_{res} = \Delta v^*(\cos E_i^* \cos dAz_i - \cos E_j^* \cos dAz_j) - v^* \Delta H^*(\cos E_i^* \sin dAz_i - \cos E_j^* \sin dAz_j) \quad (2)$$

where $\Delta v$ is the speed change sensed by the dead reckoning system, $\Delta H$ is the heading change sensed by the dead reckoning system, v is the dead reckoning system speed at time $t_k$, $E_i$ and $E_j$ are the GPS satellite elevation angles, $dAz = H - Az$, $Az_i$ and $Az_j$ are the GPS satellite azimuth angles, and H is the (unknown) heading at time $t_k$.

Equation (2) represents a nonlinear equation which should permit solving for the unknown heading, H, from the measured double-difference Doppler residual as long as either the speed or heading changes (or both change together). If neither the speed nor heading changes, the heading recovery algorithm is on hold; however, alternate approaches to heading determination with from one or two satellites can be employed.

Several methods exist for solving nonlinear equations, including numerical approaches which iterate from an initial (guessed) solution. Such methods (e.g., a gradient search technique), tend to be very sluggish, however, and so are generally not well suited for real-time implementation. An alternative, direct solution method has been developed which fits a sinusoid to the double difference function. Once the sinusoid's parameters (i.e., amplitude and phase) have been found, a direct solution for the heading is possible, albeit with a solution ambiguity which must be resolved. The direct solution method requires no prior heading information to generate a solution.

The assumed sinusoidal function is given below:

$$f(H_{any}) = f_{amp}^* \sin(H_{any} + f_{phase}) = v^*((\Delta v^*(\cos Ei^* \cos dAzi - \cos Ej^* \cos dAzj) - \Delta H^*(\cos Ei^* \sin dAzi - \cos Ej^* \sin dAzj)) \quad (3)$$

where $H_{any}$ = any heading estimate. The amplitude ($f_{amp}$) and phase ($f_{phase}$) of the sinusoid need to be determined before the unknown heading can be found by setting the sinusoidal function equal to the measured Doppler double difference. These parameters can be found from the following equations:

$$f_{phase} = \tan^{-1}(f(H_{any}), f(H_{any} + 90)) - H_{any} \quad (4)$$

$$f_{amp} = \sin^{-1}(f(H_{any}) / \sin(H_{any} + f_{phase})) \quad (5)$$

Thus, only a second evaluation of the function with a heading intentionally offset by ninety degrees is required for the nonlinear solution algorithm. Once the function parameters have been found, the unknown heading is given by:

$$H_{est} = \sin^{-1}(\delta \Delta Dopp_{res}/f_{amp}) - f_{phase} \quad (6)$$

Two solutions exist to Eq. (6) in the range (−180, 180) degrees. The ambiguity is resolved by selecting the heading solution which best matches the single Doppler differences for each satellite.

The heading solution algorithm (step 60 in FIG. 4) above has been verified in two steps: verification of the nonlinear solution method itself using (simulated) perfect Doppler measurements, and determination of the resultant heading accuracy when Doppler measurement errors are introduced. For each set of results, an initial worst case heading error of 180 degrees is assumed, and the satellite geometry is fixed for the duration of the maneuver (5 seconds), with one satellite directly overhead and a second at a specified elevation. The maneuver consists of a ninety degree heading change at a fixed specified velocity. For the zero errors case, convergence to the true heading was immediate, with a residual error which was numerically-induced (on the order of $10^{-7}$ degrees).

For the second set of tests, Doppler errors were represented as uncorrelated noise with a standard deviation of 0.05 meters per second; note that correlated errors (e.g., as are induced by SA) do not affect the Doppler difference significantly (a one-sigma Doppler measurement error due to SA contributes less than 3 millimeters per second of error to the 1 second Doppler difference). Except for the correlation due to the common Doppler measurement, successive heading solutions from the nonlinear solution algorithm are independent, i.e., successive solutions in time do not take advantage of the previous (nonlinear) solution. A Kalman filter is therefore utilized to process successive nonlinear solutions.

Figure 5:
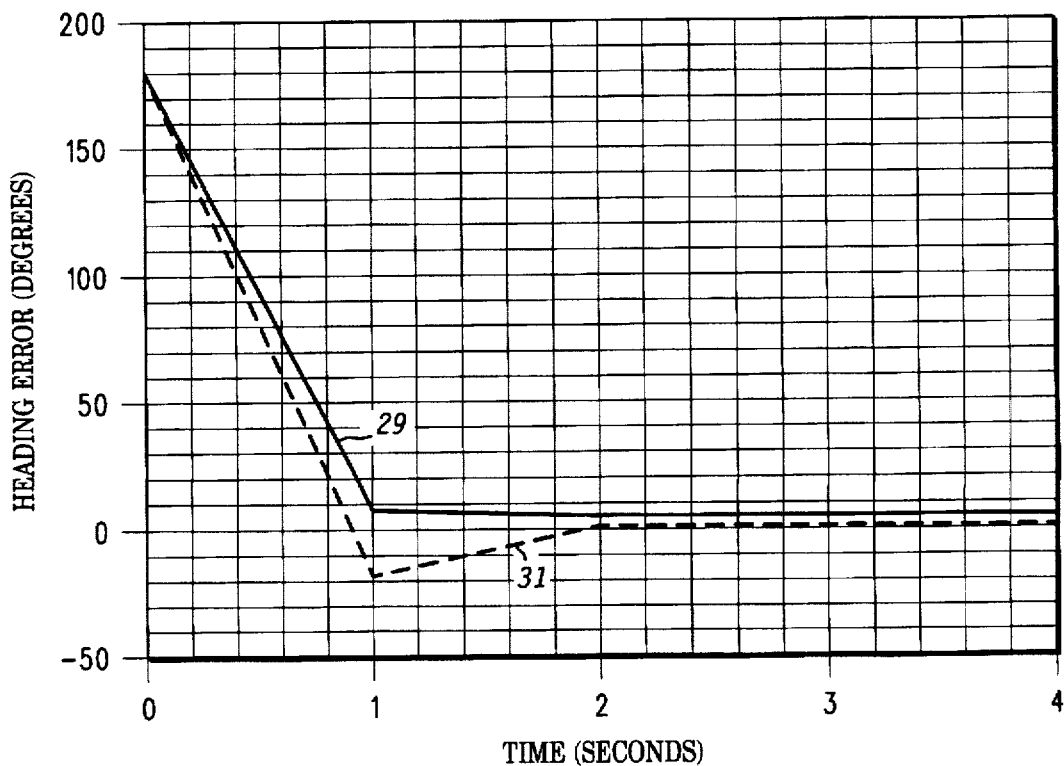
FIG. 5 is graph illustrating the effectiveness of the heading recovery algorithm of FIG. 1.

A sample time history (plot 31) of the second set of tests (with the one-sigma envelope computed by the filter superimposed as plot 29) is illustrated in FIG. 5 (corresponding to a speed of 2 meters per second and a 45 degree elevation angle). Convergence to a heading error of 1 degree is accomplished after the five-second maneuver, with the convergence generally consistent with the predicted one-sigma error envelope. Table 1 summarizes the heading accuracy achieved for a variety of conditions. Note that, in addition to determining the heading with Doppler measurements from only two satellites, an accurate heading is derived at fairly low speed. With full GPS coverage and good satellite geometry, a GPS heading is generally accurate to only 16 degrees, one sigma, at a speed this low (i.e., 2 meters per second). Also note the dependence on satellite geometry (i.e., the elevation angle $E_{min}$). This dependence should not, in general, be a problem since, even in a dense city environment, a satellite nearly overhead and a second "down the street" frequently occurs.

TABLE 1

| | Achievable Heading Accuracy (degrees) | | |
|---|---|---|---|
| | $E_{min}$ = 15 degs | $E_{min}$ = 30 degs | $E_{min}$ = 45 degs |
| v = 1 m/sec | 2.0 | 2.5 | 4.0 |
| v = 2 m/sec | 0.5 | 0.6 | 1.0 |
| v = 5 m/sec | 0.0 | 0.1 | 0.2 |

Following each iteration of the heading recovery algorithm 20, a test 22 for convergence is made to determine if the heading was recovered. If the convergence is not completed, nominal processing resumes, and the method branches back to step 10. As soon as the convergence is completed and the method so determines at step 22, however, a comparison step 24 is made between the recovered heading and the current heading which has been computed by the nominal processing 10 of the dead reckoning system.

If the difference between recovered and nominal headings is not significant or excessive (decision step 26 in FIG. 1), the heading and its uncertainty level are reset to the value corresponding to nominal processing (step 28), and nominal processing resumes with the method branching back to step 10. This branch thus corresponds to a "false alarm", i.e., a condition where the heading was never really lost. Conversely, if the recovered and nominal headings do result in a difference of excessive value, the nominal heading and its uncertainty level are reset to the recovered levels (step 30).

Following heading recovery and reset to the recovered values (step 30 in FIG. 1), an improved trajectory for the vehicle from the time that its heading was lost can be reconstructed, and the vehicle position can be accurately and reliably recovered from heading loss time (step 32). The following equations can be used to reset the current position. Assume that the position components (denoted by x and y subscripts) are propagated ahead in time at the current unknown heading from the time at which heading may be lost:

$$H_{sum}=H_{sum}+\Delta H \quad (7)$$

$$\Delta p_x = v^* \cos(H_{sum}) \quad (8)$$

$$\Delta p_y = v^* \sin(H_{sum}) \quad (9)$$

where $H_{sum}$ is a heading estimate initiated at time of heading loss, $\Delta p_x$ and $\Delta p$ represent the along and cross track position components propagated from the time at which heading was lost, respectively, v is the sensed vehicle speed, and $\Delta H$ is the sensed heading change.

Once the heading has been determined using the recovery algorithm (step 30 in FIG. 1), $H_{sum}$ can be subtracted from it to determine the vehicle heading when pulse counts were last lost and then used to convert the propagated along and cross track components to east and north position components, as follows:

$$H_{start}=H-H_{sum} \quad (10)$$

$$\Delta p_e = \Delta p_y^* \sin(H_{start}) + \Delta p_y^* \cos(H_{start}) \quad (11)$$

$$\Delta p_n = \Delta p_y^* \cos(H_{start}) - \Delta p_x^* \sin(H_{start}) \quad (12)$$

Note that Eqs. (10) through (12) produce only a single position solution at the point where the heading has been determined. If it is necessary to reconstruct the prior history from the point at which the heading was lost, then Eqs. (8) and (9) must be used to recompute the east and north position components. This latter approach requires that the velocity and $\Delta H$ history be saved until the heading is recovered.

Equations (1) and (2), which relate the Doppler differences to the unknown heading, assume that the local terrain is level. To determine the sensitivity of the heading solution to this potential error source, different road grades (up to a maximum of 30%) were incorporated into the simulation. The maximum value is representative of worst-case conditions (e.g., San Francisco). The resultant heading error generally increases as the road slope is increased, but not significantly. Since most road slopes are 3-5%, this is not considered an area of concern.

Heading error time histories have also been generated assuming scale factor errors associated with the dead reckoning system sensed heading change ranging from −5% to 5%. Since the heading scale factor can be continuously calibrated using GPS speed (e.g., to track variations in differential tire pressure in a differential odometry based DR system), an accuracy of better than 2% is expected. Thus, the heading error variations indicate that scale factor errors should not be a significant source of heading error.

Finally, velocity change, in addition to heading change, can be used to determine the vehicle heading. A sample test case was generated to demonstrate the effectiveness of this alternative approach. A uniform acceleration of 1 meter per second squared was assumed. The heading error time histories resulting exhibit uniform and consistent convergence to an accurate heading in 5 seconds. Generally, a vehicle maneuver will include both a heading and speed change, which should improve the results obtained over results obtained for either maneuver alone.

While a preferred embodiment of the present invention is described, it is contemplated that various modifications may be made thereto without departing from the spirit and scope of the present claimed invention. Accordingly, it is intended that the embodiments described be considered only as illustrative of the invention and that the scope of the invention be determined by the claims hereinafter provided.

What is claimed is:

1. A method of recovering a heading of a vehicle having a navigation system installed thereon, the navigation system including a Global Positioning System (GPS) receiver and a dead reckoning system whereby the dead reckoning system includes a heading rate sensor, the method comprising the steps of:

determining heading change information from the navigation system;

running anomaly detection tests to determine if a current heading from the dead reckoning system is in error;

incrementing a heading uncertainty in response to positive anomaly detection test results;

determining whether the heading uncertainty is excessive;

if the heading uncertainty is excessive, determining a recovered heading in response to information from both the GPS receiver and the dead reckoning system and when the GPS receiver is unable to determine a reliable heading; determining if a difference between the current heading and the recovered heading is excessive;

resetting the current heading and the heading uncertainty if the difference is excessive; and resetting a position of the vehicle in response to the reset current heading.

2. A method as claimed in claim 1, further comprising the step of recovering a position from a heading loss time.

3. A method as claimed in claim 1, wherein the step of determining a recovered heading comprises the steps of:

computing Doppler measurement double difference observables derived by a GPS receiver for at least one GPS satellite whose L band carrier is in phase or frequency track;

extracting distance traveled and heading change information from the dead reckoning system;

combining the Doppler measurement double difference observables with the distance traveled and the heading change information to produce a new estimate of the heading; and using a recursive estimator to process the new estimate of the heading with the heading change information to converge on the recovered heading.

4. A method as claimed in claim 3, wherein the step of determining a recovered heading further comprises the steps of:

using a Kalman filter to weight the heading change information with a heading estimate derived from a nonlinear solution technique; and using covariance information from the Kalman filter to determine convergence of the recovered heading.

5. A method as claimed in claim 3, where the step of extracting comprises the step of extracting from pulse count information from wheel sensors.

6. A method as claimed in claim 5, wherein the step of running anomaly detection tests comprises the step of comparing the pulse count information to a minimum reliable speed.

7. A method as claimed in claim 5, wherein the step of running anomaly detection tests further comprises the step of determining if there is an indication of a sensor failure.

8. A method as claimed in claim 5, wherein the step of running anomaly detection tests further comprises the steps of:

testing the heading change information against a maximum heading rate of the vehicle;

testing the distance traveled and the heading change information against a maximum lateral acceleration of the vehicle;

testing the distance traveled against a maximum speed of the vehicle; and testing the distance traveled against a maximum longitudinal acceleration of the vehicle.

9. A method of recovering the heading of a terrestrial vehicle navigation system comprising a GPS receiver integrated with a dead reckoning system, the method comprising the steps of:

determining that a current estimate of the heading may be in error by a predetermined excessive amount;

if the current estimate is in error by the predetermined excessive amount, computing Doppler measurement double difference observables derived by the GPS receiver when the GPS receiver is unable to determine a reliable heading;

extracting distance traveled and heading change information from heading sensors of the dead reckoning system;

combining the Doppler measurement double difference observables with the distance traveled and the heading change information to produce a new current estimate of the heading;

using a recursive estimator to process the new current estimate of the heading with the heading change information to guarantee convergence to an accurate estimate of the heading;

comparing the accurate estimate of the heading with the current estimate of the heading; and resetting the current estimate of the heading if a difference between the accurate estimate and the current estimate is excessive.

10. A method as claimed in claim 9, additionally comprising the step of constructing a position for the vehicle from a time that the heading was in error.

11. A method of recovering a heading for a vehicle with a terrestrial navigation system comprising a GPS receiver integrated with wheel sensors providing pulse count information, the method comprising the steps of:

determining that a current estimate of the heading may be in error by a predetermined excessive amount;

if the current estimate is in error by the predetermined excessive amount, computing Doppler measurement double difference observables derived by the GPS receiver when the GPS receiver is unable to determine a reliable heading;

extracting distance traveled and heading change information from the pulse count information;

combining the Doppler measurement double difference observables with the distance traveled and the heading change information to produce a new current estimate of the heading;

using a recursive estimator to process the new current estimate of the heading with the heading change information to guarantee convergence to an accurate estimate of the heading;

comparing the accurate heading estimate with the current heading estimate; and resetting the current heading estimate if a difference between the accurate estimate and the current heading estimate is excessive.

12. A method as claimed in claim 11, further comprising the steps of:

using a Kalman filter to weight the heading change information with a heading estimate derived from a nonlinear solution technique; and using covariance information from the Kalman filter to determine convergence of the accurate estimate of the heading.

13. A method as claimed in claim 11, additionally comprising the step of constructing a position for the vehicle from a time that the heading was in error.

14. A method as claimed in claim 13, additionally comprising the step of incrementing an uncertainty level associated with the current estimate of the heading using anomaly detection tests.

15. A method as claimed in claim 14, wherein the step of using anomaly detection tests comprises the step of comparing the pulse count information to a minimum reliable speed.

16. A method as claimed in claim 14, wherein the step of using anomaly detection tests comprises the step of determining if there is an indication of a sensor failure.

17. A method as claimed in claim 14, additionally comprising the step of comparing the uncertainty level with a convergence limit associated with linear estimators.

18. A method of recovering the heading of a terrestrial vehicle navigation system comprising a GPS receiver integrated with a transmission odometer and a heading rate sensor, the method comprising the steps of:

determining that a current estimate of said heading may be in error by a predetermined excessive amount;

if the current estimate is in error by the predetermined excessive amount, computing Doppler measurement double difference observables derived by the GPS receiver when the GPS receiver is unable to determine a reliable heading;

extracting distance traveled information from the transmission odometer and heading change information from the heading rate sensor;

combining said satellite Doppler measurement double difference observables with the distance traveled information and the heading change information to estimate a new current estimate of the heading;

using a recursive estimator to process the new estimate of the heading with the heading change information to guarantee convergence to an accurate estimate of the heading;

comparing the accurate estimate of the heading estimate with the current heading estimate; and resetting the current heading estimate if a difference between the accurate estimate and the current heading estimate is excessive.

19. A method as claimed in claim 18, further comprising the steps of:

using a Kalman filter to weight the heading change information with the new current estimate of the heading derived from nonlinear solution techniques; and using covariance information from the Kalman filter to determine convergence of the accurate estimate of the heading.

20. A method as claimed in claim 18, additionally comprising the step of constructing a position for the vehicle from a time that the heading was in error.

21. A method as claimed in claim 18, additionally comprising the steps of incrementing an uncertainty level associated with the current estimate of the heading in response to anomaly detection test results.

22. A method as claimed in claim 21, wherein the step of incrementing comprises the step of determining when the heading rate information is in error due to an erroneous calibration of the heading rate sensor.

23. A method as claimed in claim 21, wherein the step of incrementing comprises the step of determining when the heading rate information is in error due to heading rate sensor failure.

24. A method as claimed in claim 21, wherein the step of incrementing further comprises the step of comparing the uncertainty level with a convergence limit associated with linear estimators.

25. A method as claimed in claim 21, further comprising the step of testing the heading rate information against a maximum heading rate of the vehicle.

* * * * *